United States Patent
McCormick et al.

(10) Patent No.: US 9,943,106 B2
(45) Date of Patent: Apr. 17, 2018

(54) PACKAGE WITH COMPARTMENTS AND METHOD OF FORMING IT

(71) Applicants: PARKSIDE FLEXIBLES (EUROPE) LIMITED, Normanton (GB); Imperial Tobacco Limited, Bristol (GB)

(72) Inventors: Steve McCormick, Normanton (GB); Mark Shaw, Normanton (GB); Colin Little, Bristol (GB)

(73) Assignees: PARKSIDE FLEXIBLES (EUROPE) LIMITED, Normanton (GB); IMPERIAL TOBACCO LIMITED, Bristol (GB)

( * ) Notice: Subject to any disclaimer, the term of this patent is extended or adjusted under 35 U.S.C. 154(b) by 0 days.

(21) Appl. No.: 14/905,156

(22) PCT Filed: Jul. 24, 2014

(86) PCT No.: PCT/EP2014/065902
§ 371 (c)(1),
(2) Date: Jan. 14, 2016

(87) PCT Pub. No.: WO2015/014704
PCT Pub. Date: Feb. 5, 2015

(65) Prior Publication Data
US 2016/0150819 A1    Jun. 2, 2016

(30) Foreign Application Priority Data

Jul. 30, 2013    (GB) .................................... 1313618.9

(51) Int. Cl.
*B65D 30/22* (2006.01)
*A24F 23/02* (2006.01)
(Continued)

(52) U.S. Cl.
CPC .............. *A24F 23/02* (2013.01); *B29C 65/48* (2013.01); *B29C 65/76* (2013.01); *B29C 66/43* (2013.01);
(Continued)

(58) Field of Classification Search
CPC .... B65D 31/12; B65D 33/16; B65D 33/2508; B65D 65/14; B65D 75/30; B65D 75/5855; A24F 23/02
(Continued)

(56) References Cited

U.S. PATENT DOCUMENTS 3,511,436 A * 5/1970 Kessler .................. B65D 33/22
383/210
4,365,716 A * 12/1982 Watt ........................ B29C 65/76
156/244.11
(Continued)

FOREIGN PATENT DOCUMENTS

EP    0452167 A1 * 10/1991
EP    1913826 A1    4/2008
(Continued)

OTHER PUBLICATIONS

Machine translation of the description of EP0452167.*
(Continued)

*Primary Examiner* — Jes F Pascua
(74) *Attorney, Agent, or Firm* — Fox Rothschild LLP

(57) ABSTRACT

A package in the form of a pouch comprises a first flexible sheet part 6 and a second flexible sheet part 7. The pouch comprises a first permanent seal 14 between the first sheet part 6 and the second sheet part 7 along a first edge 12 of the pouch. The pouch comprises a second permanent seal 15 between the first sheet part 6 and the second sheet part 7 along a second edge 13 of the pouch opposite to the first edge 12. The pouch comprises a first temporary seal 16
(Continued)

between the first sheet part 6 and the second sheet part 7, the first temporary seal 16 extending across the pouch between the first permanent seal 14 and the second permanent seal 15. The pouch comprises a second temporary seal 17 between the first sheet part 6 and the second sheet part 7, the second temporary seal 17 extending across the pouch between the first permanent seal 14 and the second permanent seal 15. The pouch comprises a first compartment 20 bounded by the first sheet part 6, the second sheet part 7, the first permanent seal 14, the second permanent seal 15 and the first temporary seal 16 and a second compartment 21 bounded by the first sheet part 6, the second sheet part 7, the first permanent seal 14, the second permanent seal 15, the first temporary seal 16 and the second temporary seal 17.

11 Claims, 8 Drawing Sheets

(51) Int. Cl.
| | | |
|---|---|---|
| *B65D 33/25* | (2006.01) | |
| *B29C 65/48* | (2006.01) | |
| *B29C 65/76* | (2006.01) | |
| *B29C 65/00* | (2006.01) | |
| *B65D 33/16* | (2006.01) | |
| *B65D 65/14* | (2006.01) | |
| *B65D 75/30* | (2006.01) | |
| *B65D 75/58* | (2006.01) | |
| *B29K 705/02* | (2006.01) | |
| *B29L 31/00* | (2006.01) | |

(52) U.S. Cl.
CPC ............ *B65D 31/12* (2013.01); *B65D 33/16* (2013.01); *B65D 33/2508* (2013.01); *B65D 65/14* (2013.01); *B65D 75/30* (2013.01); *B65D 75/5855* (2013.01); *B29K 2623/12* (2013.01); *B29K 2705/02* (2013.01); *B29L 2031/7128* (2013.01); *B29L 2031/7414* (2013.01)

(58) Field of Classification Search
USPC ................... 383/38–40, 210–211, 63, 65
See application file for complete search history.

(56) References Cited

U.S. PATENT DOCUMENTS

| | | | | |
|---|---|---|---|---|
| 4,637,061 A | * | 1/1987 | Riese | B65D 31/12 206/219 |
| 4,787,755 A | * | 11/1988 | Branson | B29C 37/0082 156/66 |
| 4,806,371 A | * | 2/1989 | Mendenhall | B65D 81/3469 206/219 |
| 5,075,119 A | * | 12/1991 | Mendenhall | B65D 81/34 426/107 |
| 5,816,709 A | | 10/1998 | Demus | |
| 5,928,213 A | | 7/1999 | Barney et al. | |
| 5,941,641 A | | 8/1999 | Kinigakis et al. | |
| 6,254,907 B1 | * | 7/2001 | Galomb | B65D 51/247 206/541 |
| 6,609,998 B2 | * | 8/2003 | Lauzon | B31B 19/00 383/204 |
| 7,503,158 B2 | * | 3/2009 | Bassett | B65D 31/04 206/524.8 |
| 7,770,611 B2 | * | 8/2010 | Houwaert | A61J 1/10 141/114 |
| 8,485,728 B2 | * | 7/2013 | Bowers | B65D 33/30 383/204 |
| 8,517,609 B2 | * | 8/2013 | Conner | B65D 33/00 229/101 |
| 9,181,014 B2 | * | 11/2015 | LaFauci | B65D 33/2508 |
| 9,238,537 B2 | * | 1/2016 | Edwards | B65B 9/2056 |
| 2003/0053721 A1 | * | 3/2003 | Goldman | A45C 11/26 383/38 |
| 2004/0223801 A1 | | 11/2004 | Detwiler et al. | |
| 2005/0194060 A1 | * | 9/2005 | Houwaert | A61J 1/10 141/114 |
| 2005/0271307 A1 | | 12/2005 | Pawloski et al. | |
| 2007/0080078 A1 | * | 4/2007 | Hansen | B65D 81/3266 206/219 |
| 2007/0114144 A1 | | 5/2007 | Suzuki et al. | |
| 2008/0107781 A1 | * | 5/2008 | Carroll | B65D 31/12 426/128 |
| 2008/0240628 A1 | | 10/2008 | VanLoocke et al. | |
| 2009/0257685 A1 | * | 10/2009 | Matias | B65D 77/225 383/38 |
| 2009/0299324 A1 | | 12/2009 | Inoue et al. | |
| 2010/0272868 A1 | | 10/2010 | Krysty et al. | |

FOREIGN PATENT DOCUMENTS

| | | | |
|---|---|---|---|
| GB | 1216087 | | 12/1970 |
| GB | 2134067 | | 8/1984 |
| GB | 2134067 A | | 8/1984 |
| GB | 2538267 A | * | 11/2016 |
| NL | 8701152 | | 5/1987 |
| NL | 8701152 | | 12/1988 |

OTHER PUBLICATIONS

Machine translation of the description of EP1913826.*
GB Search Report from corresponding application No. GB1313618.9 dated Feb. 29, 2016.
Search Report from corresponding priority application No. GB1313618.9 dated Jun. 27, 2014.
International Search Report from PCT/EP2014/065902 dated Nov. 14, 2014.

* cited by examiner

PACKAGE WITH COMPARTMENTS AND METHOD OF FORMING IT

CROSS-REFERENCE TO RELATED APPLICATIONS

This application is a § 371 U.S. National Stage of International Application No. PCT/EP2014/065902, filed Jul. 24, 2014, which claims priority to and the benefit of Great Britain Application No.: 1313618.9, filed Jul. 30, 2013, the entireties of which are both hereby incorporated herein by reference.

TECHNICAL FIELD

This disclosure relates to packaging technologies, and in particular to the formation of a package in the form of a pouch.

BACKGROUND

It is desirable that packaged commodities remain fresh for consumption for as long as possible. While it is possible to maintain a packaged commodity in a hermetically sealed condition up to the point of opening, the quality of the packaged commodity can deteriorate after the package is opened. Resealable packaging is available, but resealable seals typically do not provide a hermetic seal.

An example of a packaged commodity is hand-rolled tobacco. A package of hand-rolled tobacco is hermetically sealed up to the point of opening. After opening, the tobacco loses moisture and dries out, so affecting the smoking experience.

There is a requirement for improved packaging of commodities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a package in the form of a pouch comprising: a first flexible sheet part; a second flexible sheet part; a first permanent seal between the first sheet part and the second sheet part along a first edge of the pouch; a second permanent seal between the first sheet part and the second sheet part along a second edge of the pouch opposite to the first edge; a first temporary seal between the first sheet part and the second sheet part, the first temporary seal extending across the pouch between the first permanent seal and the second permanent seal; a second temporary seal between the first sheet part and the second sheet part, the second temporary seal extending across the pouch between the first permanent seal and the second permanent seal; a first compartment bounded by the first sheet part, the second sheet part, the first permanent seal, the second permanent seal and the first temporary seal; and a second compartment bounded by the first sheet part, the second sheet part, the first permanent seal, the second permanent seal, the first temporary seal and the second temporary seal.

The first sheet part and the second sheet part may be parts of a continuous flexible sheet, with the second sheet part folded against the first sheet part.

The first sheet part and the second sheet part may be separate pieces of flexible sheet and the package further comprises a third permanent seal between the first sheet part and the second sheet part along a third edge of the pouch.

At least one of the first temporary seal and the second temporary seal may comprise a peelable adhesive seal.

At least one of the first temporary seal and the second temporary seal may comprise, or further comprise, a resealable adhesive seal.

The resealable adhesive may be a pressure sensitive adhesive.

In other words, at least one of the first temporary seal and the second temporary seal may comprise or consist of a peelable adhesive seal or a resealable seal. The resealable seal may be a resealable adhesive seal, like e.g. a pressure sensitive adhesive, or a resealable fixing, like e.g. a zipper. Preferably, at least one of the first and second temporary seal comprises or consists of a peelable adhesive seal. More preferably, the first temporary seal may comprise or consist of a peelable adhesive seal.

The first temporary seal may comprise or consist of a peelable adhesive seal, whereas the second temporary seal may comprise or consist of a resealable seal, like e.g. a resealable adhesive seal or a resealable fixing.

At least one of the first temporary seal and the second temporary seal may further comprise a resealable fixing.

The flexible sheet parts may comprise adhesive properties which vary according to temperature applied to the first layer.

The sheet parts may have a first adhesion value at a first applied temperature and a second adhesion value at a second applied temperature, wherein the second adhesion value is lower than the first adhesion value and the second temperature is lower than the first temperature.

The first sheet part may be longer than the second sheet part and wherein a portion of the first sheet part which is not overlapped by the second sheet part may comprise a flap for the pouch.

The flap may comprise a temporary seal for sealing the flap against the pouch.

The second temporary seal may be offset from a free edge of the second sheet part to form a throat of the pouch, wherein the first sheet part is overlapped by the second sheet part at the throat.

At least one of the compartments may comprise a further seal between the first sheet part and the second sheet part which divides the compartment into two sub-compartments. The further seal can extend parallel to the first permanent seal.

The sub-compartments may be of different size.

The package may further comprise: a third temporary seal between the first sheet part and the second sheet part, the third temporary seal extending across the pouch between the first permanent seal and the second permanent seal; and a third compartment bounded by the first sheet part, the second sheet part, the first permanent seal, the second permanent seal, the second temporary seal and the third temporary seal.

The sheet parts may comprise a laminate having a plurality of layers.

One of the layers of the laminate may comprise a barrier layer.

The package may be in the form of a tobacco pouch, such as for hand-rolled tobacco.

The first and/or the second temporary seals may be formed in sealing areas of the first and second flexible sheet parts respectively, wherein the sealing areas are folded from a wide surface area of the first and second flexible sheet part, respectively. By doing so, a pouch type package may be formed, wherein the first compartment is arranged in parallel to the second compartment with a wide surface of the first compartment facing a wide surface of the second compartment. Preferably, the sealing area is folded at an angle of 70° to 120°, preferably of 80° to 110°, relative to the wide surface area of the first or the second flexible sheet part, respectively. If the sealing area is folded at such a preferred angle, the package of the invention comprising such sealing area is able to stand on said sealing area, i.e. said sealing area may form a base or footprint for the package of the invention. Furthermore, if two sealing areas are formed at opposing ends of the package (i.e. first and second temporary seals are formed in respective sealing areas respectively), the resulting package will exhibit an improved stackability compared to classical pouch type packages.

In order to allow for improved package symmetry, the opposed sealing areas may be coordinated in size, width and/or position. Preferably, the opposing sealing areas exhibit equal size and/or width. Preferably, the opposing sealing areas are formed and located such that the resulting package exhibits a cuboid-like outer appearance, wherein the opposing sealing members form two opposing faces of said cuboid.

The sealing members may have a width which exceeds the sum of the thickness of the first and second compartment and, thus, allows for the formation of a spacing between the first compartment and the second compartment. Such spacing may be used to place accessoires like e.g. a paper booklet between the first and second compartment.

Such sealing area may have a width from 1 mm to 3 cm, preferably from 2 mm to 2.5 cm. If the sealing area has a width of less than 1 mm, said sealing area may be less suitable to serve as base or footprint for the package of the invention.

There is also provided a method of forming a package in the form of a pouch comprising: providing a first sheet part and a second sheet part; forming a first permanent seal between the first sheet part and the second sheet part along a first edge of the pouch; forming a second permanent seal between the first sheet part and the second sheet part along a second edge of the pouch opposite to the first edge; forming a first temporary seal between the first sheet part and the second sheet part, the first temporary seal extending across the pouch between the first permanent seal and the second permanent seal whereby to form a first compartment bounded by the first sheet part, the second sheet part, the first permanent seal, the second permanent seal and the first temporary seal; forming a second temporary seal between the first sheet part and the second sheet part, the second temporary seal extending across the pouch between the first permanent seal and the second permanent seal whereby to form a second compartment bounded by the first sheet part, the second sheet part, the first permanent seal, the second permanent seal, the first temporary seal and the second temporary seal.

In the method of the invention, the first temporary seal may be formed to comprise or consist of a peelable adhesive seal, whereas the second temporary seal may be formed to comprise or consist of a resealable seal.

The first sheet part and the second sheet part may be parts of a continuous flexible sheet, the method further comprising folding the second sheet part against the first sheet part before forming the seals.

The first sheet part and the second sheet part may be separate pieces of flexible sheet material and the method further comprises forming a third permanent seal between the first sheet part and the second sheet part along a third edge of the pouch.

In the method of the invention, the first and/or the second temporary seals may be formed in a sealing area of the first and second flexible sheet part which is then folded from a wide surface area of the first and second flexible sheet part, respectively. By doing so, a pouch type package may be formed, wherein the first compartment is arranged in parallel to the second compartment with a wide surface of the first compartment facing a wide surface of the second compartment. Preferably, the sealing area is folded at an angle of 70° to 120°, preferably of 80° to 110°, relative to the wide surface area of the first or the second flexible sheet part, respectively. If the sealing area is folded at such a preferred angle, the package of the invention comprising such sealing area is able to stand on said sealing area, i.e. said sealing area may form a base or footprint for the package of the invention. Furthermore, if two sealing areas are formed at opposing ends of the package (i.e. first and second temporary seals are formed in respective sealing areas respectively), the resulting package will exhibit an improved stackability compared to classical pouch type packages.

In order to allow for improved package symmetry, the opposed sealing areas may be formed such that they are coordinated in size, width and/or position. Preferably, the opposing sealing areas exhibit equal size and/or width. Preferably, the opposing sealing areas are formed and located such that the resulting package exhibits a substantially cuboid-like outer appearance, wherein the opposing sealing members form two opposing faces of said cuboid.

The sealing members may have a width which exceeds the sum of the thickness of the first and second compartment and, thus, allows for the formation of a spacing between the first compartment and the second compartment. Such spacing may be used to place accessoires like e.g. a paper booklet between the first and second compartment.

Such sealing area may have a width from 1 mm to 3 cm, preferably from 2 mm to 2.5 cm. If the sealing area has a width of less than 1 mm, said sealing area may be less suitable to serve as base or footprint for the package of the invention.

Providing multiple compartments can improve freshness of the stored commodity as a smaller amount of commodity (e.g. tobacco) is exposed when the pouch is opened, thus keeping the rest of the tobacco in a freshly packed environment. The pouch is compatible with conventional packing methods and is convenient to use.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
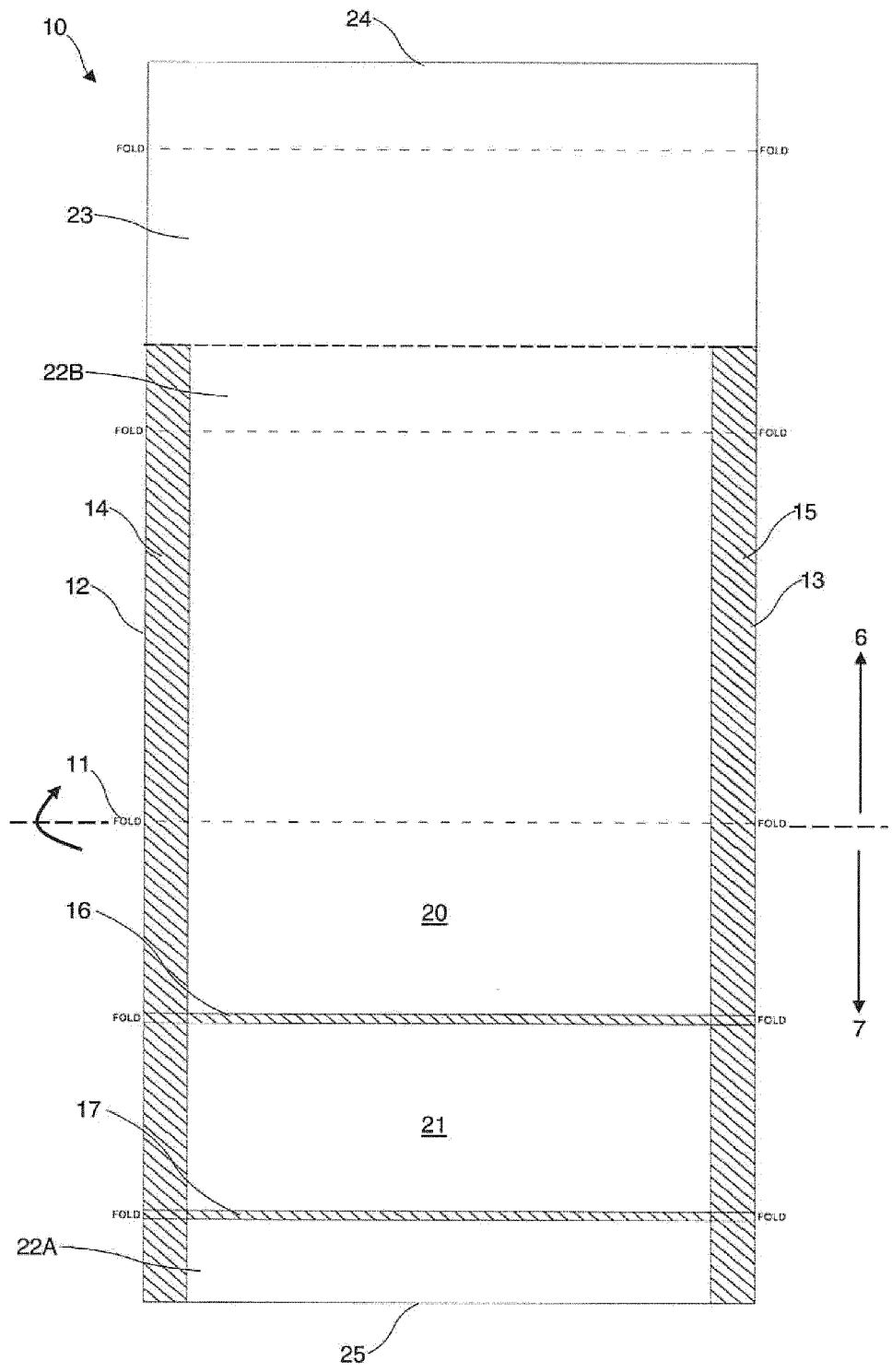
FIG. 1 shows a first example of a flat sheet used to form a pouch.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a first example of a flat sheet 10 of flexible sheet material used to form a package.

Figure 2:
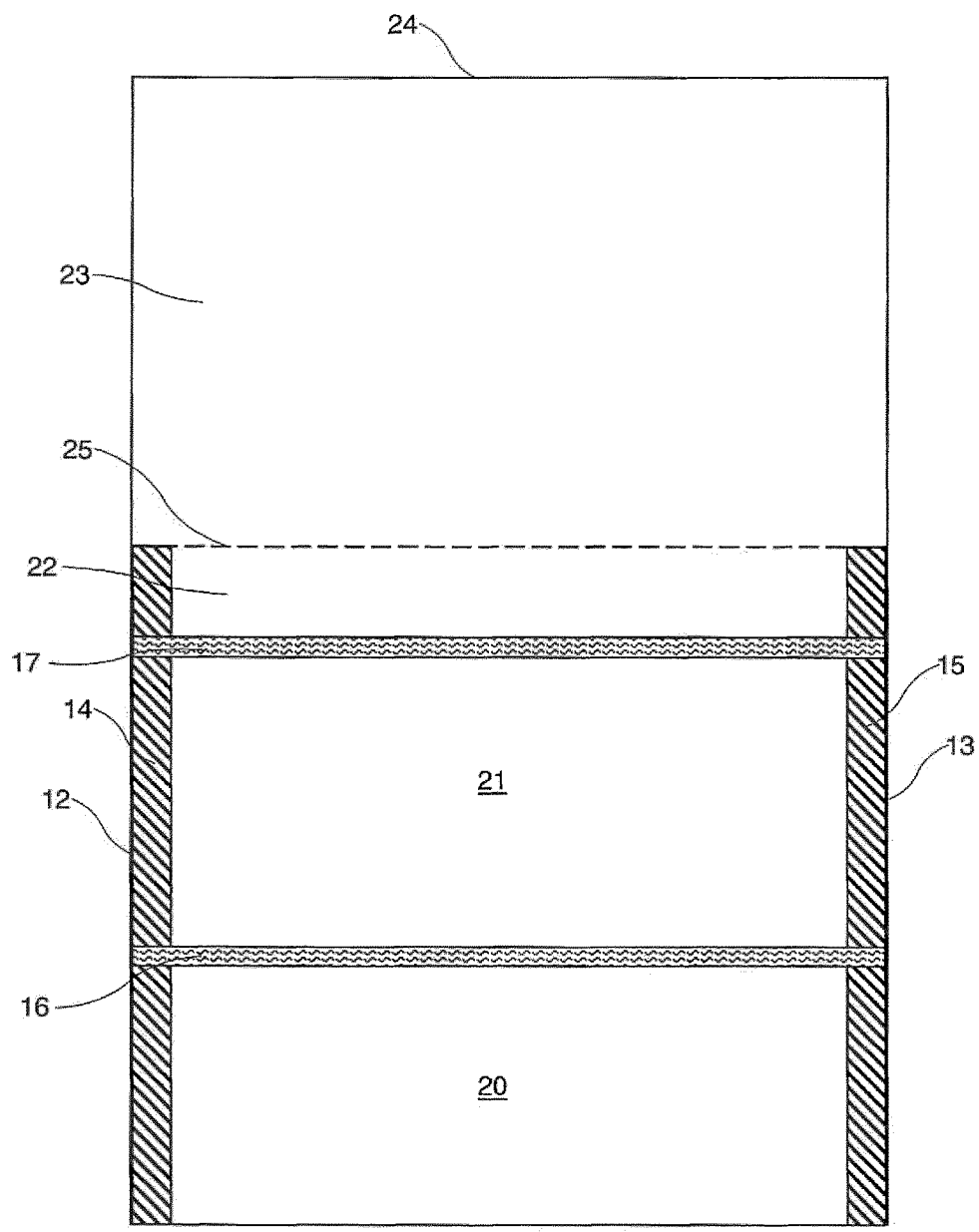
FIG. 2 shows the flat sheet of FIG. 1 after being formed into the pouch.

The package is in the form of a pouch having multiple compartments. FIG. 2 shows a front view of the blank after being formed into the pouch and FIG. 3 shows the assembled pouch.

In an embodiment, the pouch is formed from a single continuous sheet of material which is folded in two to form the pouch. In another embodiment, the pouch is formed from two separate pieces of sheet material, with one of the pieces being laid upon, and sealed to, the other piece. In each of these embodiments, there is a first flexible sheet part 6 and a second flexible sheet part 7. The embodiment using one continuous sheet will now be described in more detail. The term "first flexible sheet part" 6 refers to the part of the sheet on one side of a fold line 11 and the term "second flexible sheet part" 7 refers to the part of the sheet on the other side of the fold line 11. The flexible sheet material can have a single layer or multiple layers bonded together. A multiple layer material is called a laminate. Edges 12, 13 on opposing sides of the sheet 10 will be called side edges. The sheet also has edges 24, 25 at opposing ends of the sheet.

FIG. 1 also shows the location of seals between the first flexible sheet part 6 and the second flexible sheet part 7 to form the pouch. The seals are formed when the flat sheet 10 is formed into a pouch. A first permanent seal 14 between the first sheet part 6 and the second sheet part 7 is located along the first edge 12 of the pouch. A second permanent seal 15 between the first sheet part 6 and the second sheet part 7 is located along a second edge 13 of the pouch opposite to the first edge 12. A first temporary seal 16 between the first sheet part 6 and the second sheet part 7 is located transversely across the pouch between the first permanent seal 14 and the second permanent seal 15. The first temporary seal 16 can extend up to the edges 12, 13, or stop short of the edges. To ensure a hermetic seal, there should be some overlap between the permanent seals 14, 15 and the temporary seal 16. A second temporary seal 17 between the first sheet part 6 and the second sheet part 7 is located transversely across the pouch between the first permanent seal 14 and the second permanent seal 15. A first compartment 20 is bounded by the first sheet part 6, the second sheet part 7, the first permanent seal 14, the second permanent seal 15, the first temporary seal 16 and the folded edge 11 of the sheet. A second compartment 21 is bounded by the first sheet part 6, the second sheet part 7, the first permanent seal 14, the second permanent seal 15, the first temporary seal 16 and the second temporary seal 17. After forming the permanent seals 14, 15, each of the compartments 20, 21 is filled with a commodity (e.g. tobacco) and then the temporary seals 16, 17 are formed. The perimeter of each compartment is bounded by permanent seals and at least one temporary seal which provide a hermetically sealed environment for the commodity. The division of the overall storage space of the pouch into compartments allows the batch of the commodity within compartment 20 to remain hermetically sealed until it is required.

Typically, the flat sheet 10 will be formed into a pouch at one manufacturing location. However, it is also possible to that the flat sheet 10 can be partially formed into the pouch during a first manufacturing stage at one location (for example, just forming the permanent seals 13, 14 of the pouch) and then performing the remaining steps during a further manufacturing stage at a different location.

The term "permanent seal" means a seal which provides structural integrity to a seam of the pouch and which cannot easily be opened by a user. For example, it can be a strong adhesive bond, or a heat weld. An example of a permanent seal is where the polymers of the sheet parts 6, 7, under heat, melt and weld together giving a permanent seal. For example, two sheet parts 6, 7, of polythene sealing together.

The term "temporary seal" means a seal which provides a seal between two surfaces, but which can be opened by a user by applying an opening force between the surfaces. A temporary seal preferably comprises or consist of a peelable adhesive seal or a resealable seal. The resealable seal may be a resealable adhesive seal, like e.g. a pressure sensitive adhesive, or a resealable fixing, like e.g. a zipper. Advantageously, at least one of the temporary seals is a peelable seal.

FIGS. 1 and 2 show that the first sheet part 6 is longer than the second sheet part 7. A portion 23 of the first sheet part 6 which is not overlapped by the second sheet part 7 comprises a flap for the pouch. The flap 23 can comprise a temporary seal for sealing the flap 23 against the remainder of the pouch. For example, the flap 23 can carry an adhesive tab (28, FIG. 3). The tab 28 can have resealable adhesive applied to an inner face of the tab 28 for forming a resealable seal. Another example is that an inner face of the flap 23 itself can have a region of resealable adhesive applied to it for forming a resealable seal.

Figure 3A:
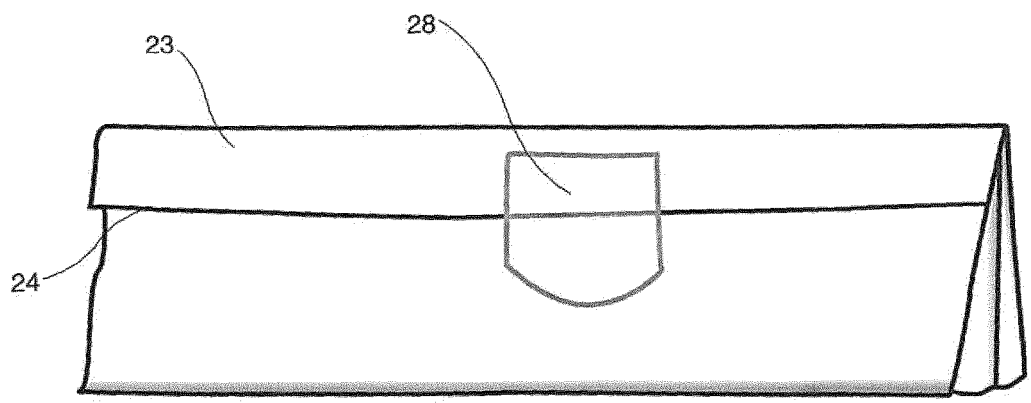
FIGS. 3A and 3B show the final pouch in a storage configuration.
Figure 3B:
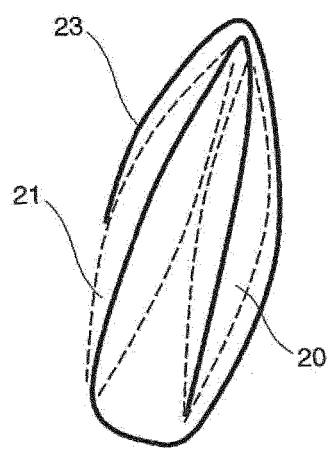

The flap 23 can be folded about a fold line located along the line of the temporary seal 17. The pouch can be stored with the two compartments 20, 21 laid flat, and the flap 23 lying flat on top of the two compartments 20, 21. Alternatively, the pouch can be stored in a roll configuration. Compartment 21 is folded about the line of the temporary seal 16 back towards the compartment 20, and the flap 23 is folded about the fold line located along the line of the temporary seal 17. The flap 23 wraps around the outside of the compartment 20 and secures to the rear face of compartment 21. This is shown in FIGS. 3A and 3B.

FIGS. 1 and 2 show that the second temporary seal 17 (and fold line) is offset from a free edge 25 of the second sheet part 7 to form a throat 22 of the pouch. The first sheet part 6 is overlapped by the second sheet part 7 at the throat 22. The throat serves to prevent commodity (e.g. tobacco) from spilling out of the pouch.

A plurality of fold lines are shown in FIG. 1. The folds can be formed when forming the pouch.

The temporary seals 16, 17 provide a hermetic sealing of their respective compartments 20, 21 until access to the commodity is required by separating the first sheet 6 and the second sheet 7 to overcome the temporary seal. A user can gain access to compartment 21 by opening the temporary seal 17. This can be achieved by grasping the free edge 25 of the throat region 22 of the second sheet part 7 using fingers and applying a force against the flap 23 of the first sheet part 6 with another finger. Once a user has gained access to compartment 21, the other compartment 20 remains sealed until the temporary seal 16 is opened.

The temporary seals 16, 17 can comprise or consist of a peelable adhesive seal or a resealable seal. The resealable seal may be a resealable adhesive seal, like e.g. a pressure sensitive adhesive, or a resealable fixing, like e.g. a zipper. Preferably, at least one of the temporary seals 16, 17 comprises or consists of a peelable adhesive seal. More preferably, the first temporary seal 16 may comprise or consist of a peelable adhesive seal, whereas the second temporary seal 17 may comprise or consist of a resealable seal, like e.g. a resealable adhesive seal or a resealable fixing.

The temporary seals 16, 17 can comprise a peelable adhesive seal. A peelable adhesive is an adhesive which provides a seal, but which allows the seal to be opened by applying a separating force to the first sheet part 6 and second sheet part 7. A peelable adhesive layer can be pattern applied by means of Flexographic, Gravure, or digital printing/coating or by transfer application. The peelable adhesive can be applied with a weight in the range 0.5-12 grams/square metre, depending on the formulation of the adhesive and application process. This gives areas in the pack with lower heat seal bonds that keep the compartment together but still allow easy access by the means of a peelable opening.

Figure 4:
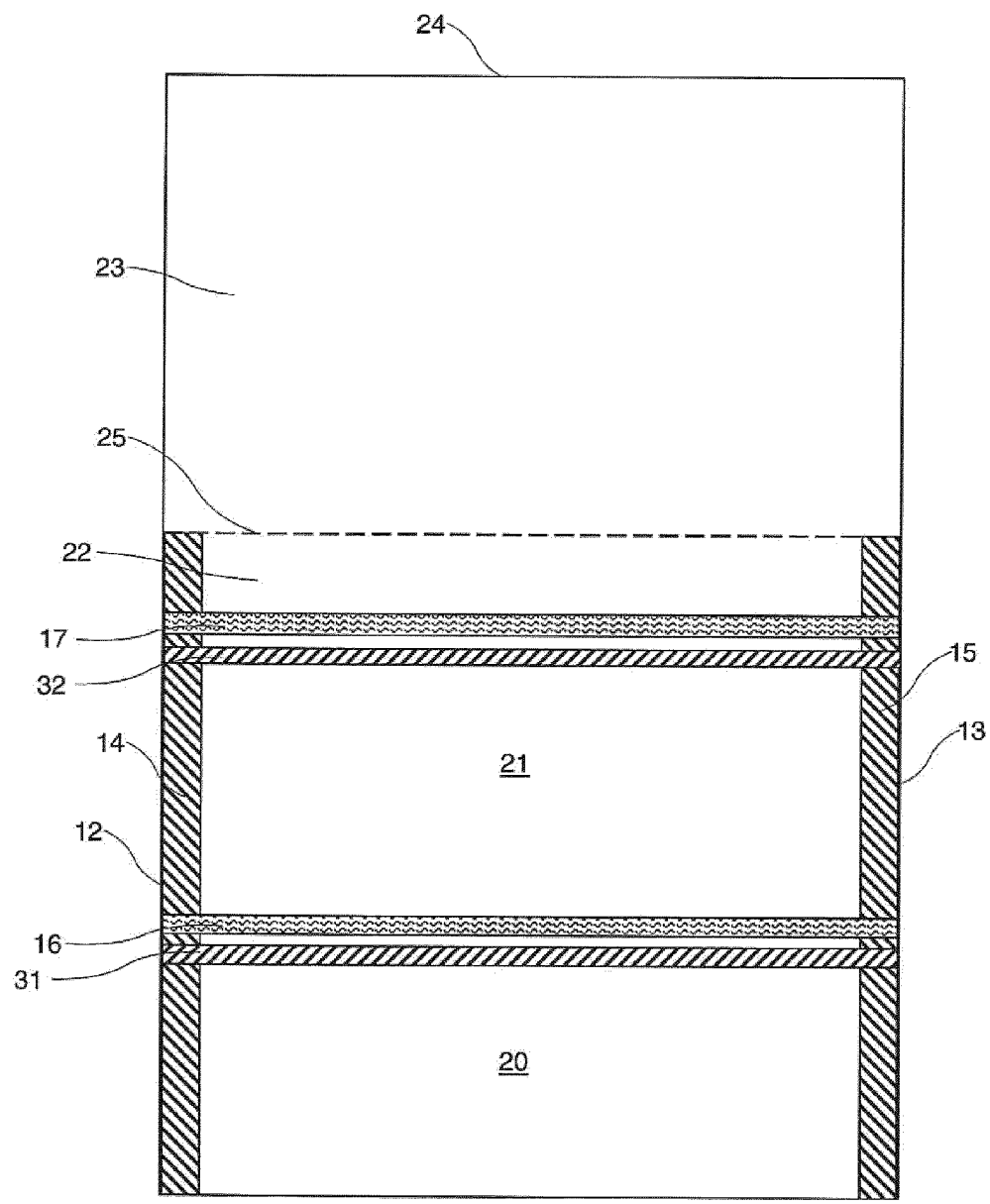
FIG. 4 shows another example of a flat sheet used to form a pouch with resealable seals.

A peelable adhesive seal will typically not allow resealing after the seal has been opened. Advantageously, the temporary seal further comprises a resealable seal which can be provided in addition to the peelable adhesive seal. FIG. 4 shows resealable seals 31, 32. The resealable seal 32 is positioned inwardly of the temporary seal 17 (i.e. further from free edge 25). A pressure sensitive adhesive (PSA) can be used as a resealable seal. A PSA will adhere two surfaces, but allow their separation and later re-adherence. The PSA can be applied during manufacture by means of Flexographic, Gravure, Digital printing/coating or by transfer application. A typical weight range for the PSA is 0.5 to 20 grams/square metre. The peelable adhesive can be applied during forming the pouch (by the converter/packer) by means of a self-adhesive strip.

An alternative to using a PSA as a resealable seal is to provide a resealable fixing, such as a zipper. Typically, a resealable fixing has two elements which cooperate to provide a seal. One of the resealable seal elements can be provided on the first sheet part 6 and the other of the resealable seal elements can be provided on second sheet part 7.

In an embodiment where a laminate is used as the sheet material 10, another alternative to providing a resealable seal 31, 32 is to create a removable or peel away tab/label within the laminate structure of the sheet material used to form the pouch. For example, an outer layer of the laminate can be bonded to an inner layer by PSA. A cut line defining the tab/label can be created in the outer layer (e.g. by laser). Subsequently, a user can peel away the tab/label to reveal the resealable layer. These tabs/labels can be of any size or shape. This can have an advantage of making the compartment easier to open, as a user only needs to separate the temporary seal 16, 17 instead of a combination of the temporary seal 16, 17 and the resealable seal 31, 32 when first opening the compartment 20, 21. Once the compartment is opened, the tab/label can be removed to reveal the resealable seal, and the resealable seal is thereafter used to seal the compartment.

The permanent seals 14, 15 can be formed by heat sealing, i.e. applying heat to the region where the seal is required until the first sheet part 6 and the second sheet part 7 are fused together. Advantageously, the permanent seals 14, 15 are weld seals which are sufficiently strong to hold the pack together in normal use.

An alternative way of forming the combination of permanent seals 14, 15 and temporary seals 16, 17 will now be described. The sheet material used to form the pouch has a variable heat sealing range. The adhesive properties of the sheet material vary according to temperature applied to the material. The material has a first (high) adhesion for a high applied temperature and a second (lower) adhesion value at a lower applied temperature. The material can be designed such that the first (high) adhesion is suitable for the permanent seals, and the second (lower) adhesion value is suitable for the temporary seals. The package can be formed by using a variable temperature sealing flat sheet which applies temperatures to regions of the flat sheet which are appropriate to the adhesion values required in those regions. In the case of a variable heat seal, either the sealing temperature or dwell time can be altered, or a combination of both temperature and dwell time. The sheet material can comprise a co-extruded Polythene that exhibits variable heat seal properties depending on the combination of polymers used. In general, the flat sheet of material 10, a layer of the flat sheet of material and/or a coating of the sheet of material may have adhesive properties which vary according to temperature applied to the material.

It will be understood that the compartments 20, 21 of the pouch can be of any desired shape and/or size. In FIGS. 1, 2 and 4 each temporary seal line 16, 17 is a straight line transversely across the pouch between edges 12, 13. However, the temporary seal line can have other shapes. Any shape of seal line can be provided, such as a circle, arc, logo etc.

Figure 5:
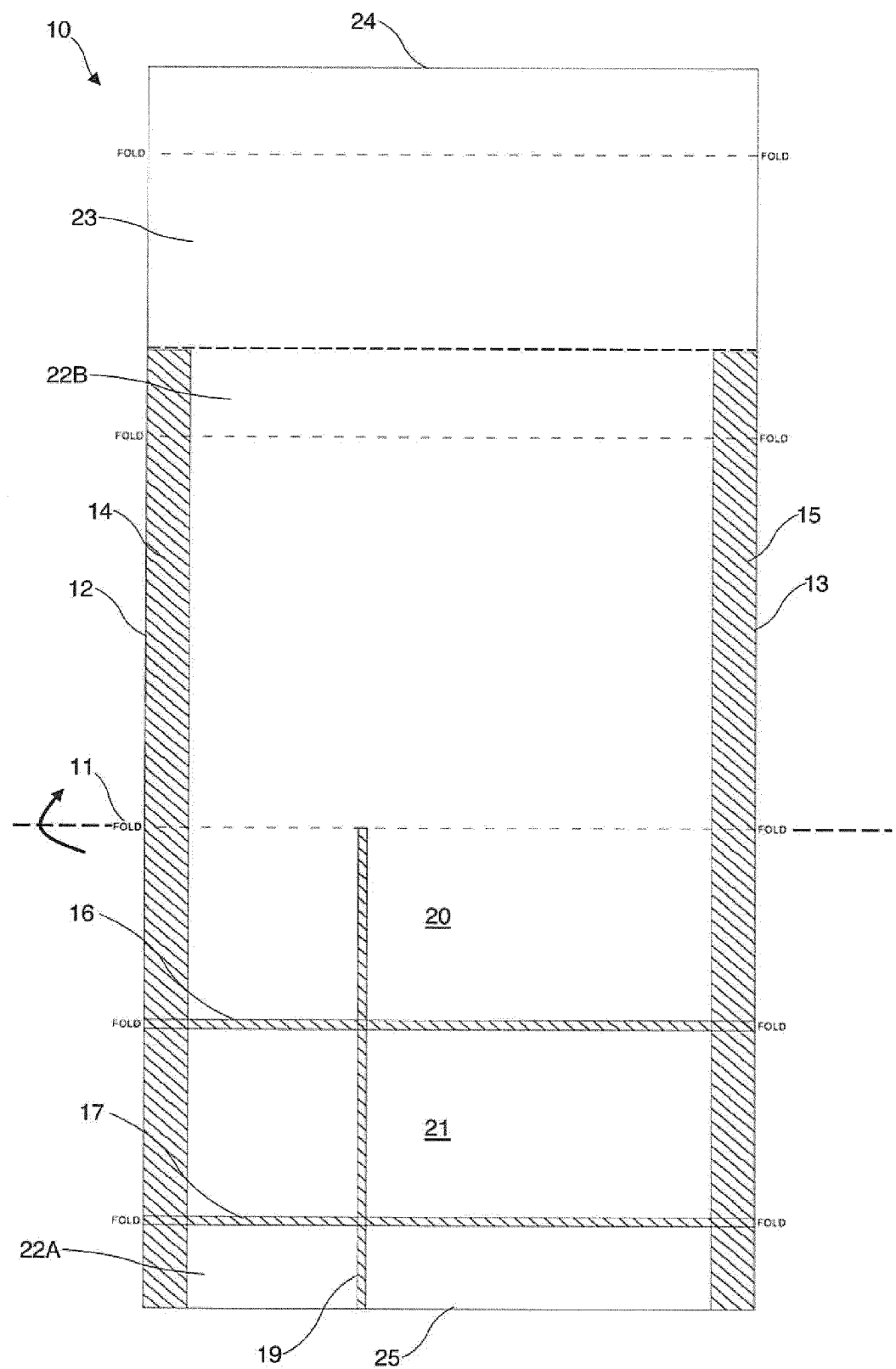
FIG. 5 shows the flat sheet of FIG. 4 after being formed into the pouch.
Figure 6:
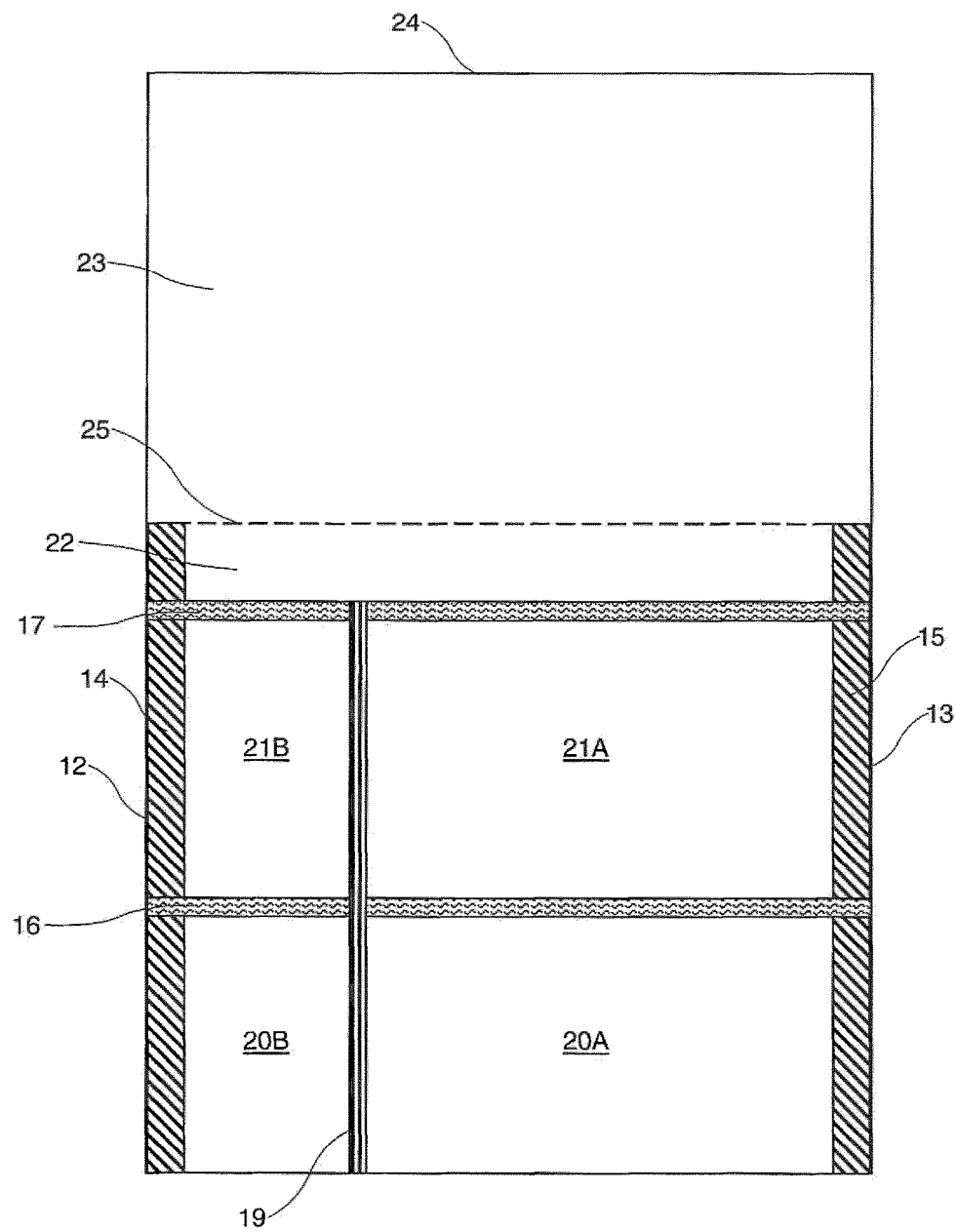
FIG. 6 shows another example of a flat sheet used to form a pouch with sub-compartments.

One or more of the compartments 20, 21 can be divided into sub-compartments. An example of this is shown in FIGS. 5 and 6. An additional seal line 19 is provided. Advantageously, the seal 19 joins with seals 16, 17 to provide a hermetic seal between sub-compartments 21A and 21 B and, similarly, provides a hermetic seal between sub-compartments 20A and 20B. In the case of a pouch for storing hand-rolled tobacco, sub-compartments 20A, 21A can be used for storing tobacco and sub-compartments 21A, 21B can be used for storing other smoker products, such as cigarette papers. Advantageously seal 19 this is a temporary seal so that the seal can be opened when required. For example, after using the contents of compartment 21, the sub-compartments can be merged into a single larger compartment to allow easier access to compartment 20. Further lines 19 can be provided to provide further sub-compartments, as required.

While embodiments have been described with two compartments 20, 21, any desired number of compartments can be provided. Each additional compartment requires a further temporary seal across the pouch. Each additional compartment is bounded by the first sheet part 6, the second sheet part 7, the first permanent seal 14, the second permanent seal 15, and a pair of temporary seals.

The sheet material used to form the pouch can comprise a laminate. One or more layers of the laminate can serve as: an Oxygen barrier; a moisture barrier, an anti-microbial barrier; an odour barrier. A breathable layer could also be provided. A breathable layer can allow gases that build up in packages, e.g., coffee to escape the package without affecting the seal.

An example of a three-layer laminate suitable for use as a packaging material is an outer layer formed of a polymer material, for example 20 micron orientated polypropylene (OPP) bonded to an inner layer, for example formed of 9 micron Aluminium foil. The inner foil layer is bonded to a second outer layer formed of a polymer material, which may be the same as the first outer layer, or a different polymer material. The triple-laminate structure is advantageous for packaging because it is hermetically sealed and flexible. The layers are laminated together utilising a permanent lamination adhesive.

The flap 23 of the pouch can be formed as described in the co-pending UK Patent Application GB1216087.

In another embodiment, the pouch can be formed from two separate pieces of sheet material, with one of the pieces being laid upon, and sealed to, the other piece. Referring to FIG. 1, the first sheet part 6 and the second sheet part 7 will be separate pieces in this embodiment. An additional permanent seal is required between the first sheet part 6 and the second sheet part 7 along a first edge of the pouch, which is the position of the fold line 11 of FIG. 1.

It is possible to create removable or peel away tabs/labels within the laminate structure of sheet material used to form the pouch. For example, these can be created using layers which are bonded by PSA or by peelable adhesive. Cut lines can created by lasers. This could be used to create or add coupons, hidden messages or security devices such as QR codes, invisible watermarks, fluorescents or bi fluorescents or other security measures. It is also possible to create re-seal areas by the means of removable or peel away tabs/labels. These tabs/labels can be of any size or shape.

The phrase 'hermetic seal' has been utilised through this description. As will be appreciated while a truly hermetic seal is often desirable in many applications a substantially airtight seal may be sufficient. Any or all of the seals described herein as being hermetic may therefore also be provided as a seal providing a suitable level of sealing for the application concerned but which is not strictly hermetic.

Figure 7:
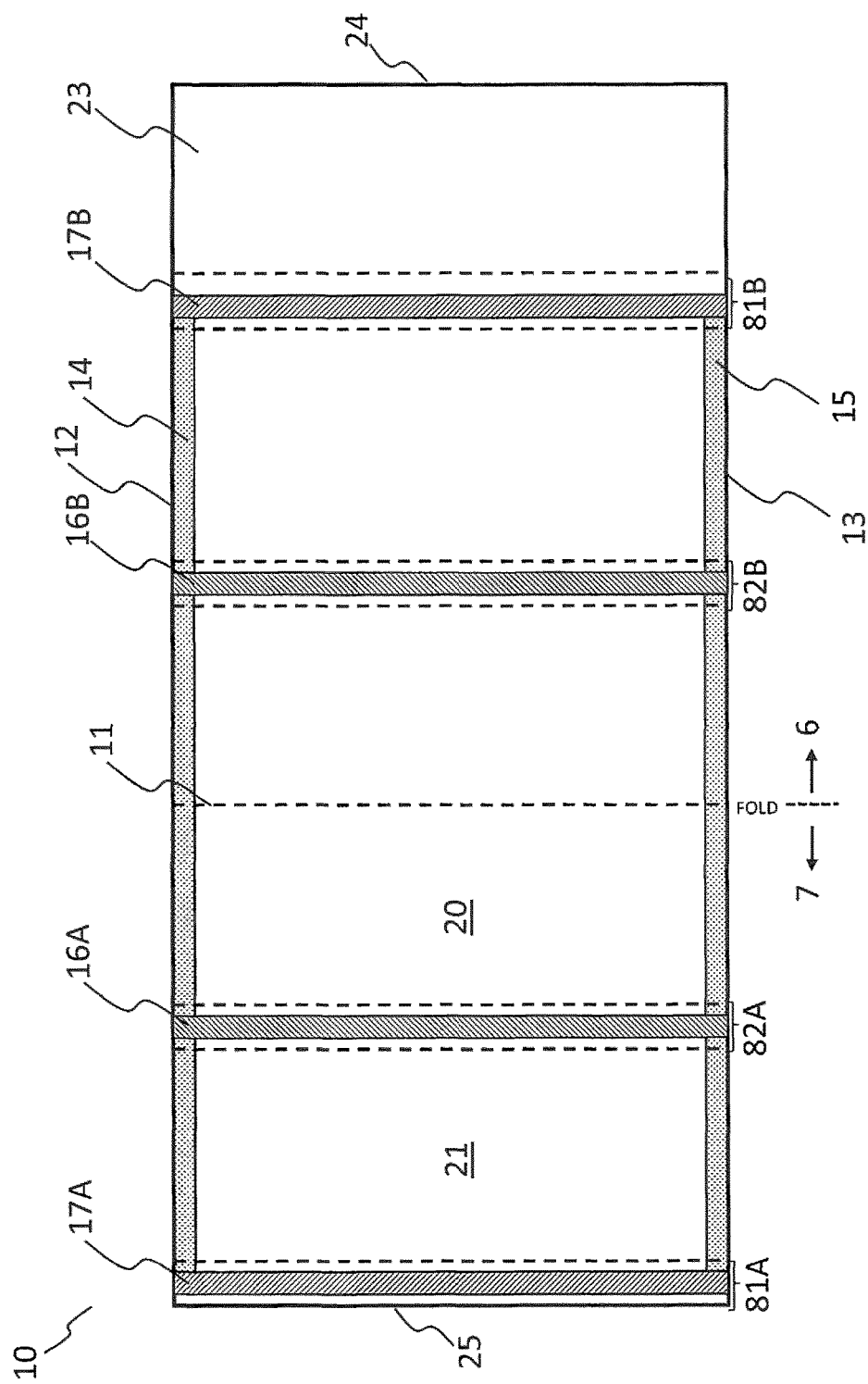
FIG. 7 shows another example of a flat sheet used to form a pouch-type package of the invention.

In FIGS. 7 another preferred embodiment is shown, wherein like reference numerals are used to indicate similar features with embodiments described above. In order to avoid lengthy repetition, the following description focusses on the differences or additional features of this embodiment compared to the embodiment shown in FIG. 1 and described in detail above.

In the embodiment of FIG. 7, the first temporary seal 16 is formed by two areas denoted with reference numerals 16A and 16B to indicate that the seal is finally formed between two specific areas of the first flexible sheet part 6 and the second flexible sheet part 7. Thus, after folding along the folding line 11, the flexible sheet part areas 16A and 16B are brought in contact and form the first temporary seal 16. The first temporary seal 16 is formed to comprise or consist of a peelable adhesive seal.

The same is true for the second temporary seal. In the embodiment of FIG. 7, the second temporary seal 17 is formed by two areas denoted with reference numerals 17A and 17B to indicate that the seal is finally formed between two specific areas of the first flexible sheet part 6 and the second flexible sheet part 7. Thus, after folding along the folding line 11, the flexible sheet part areas 17A and 17B are brought in contact and form the second temporary seal 17. The second temporary seal is formed to comprise or consist of a resealable seal, preferably of a resealable adhesive seal or a resealable fixing, like e.g. a zipper. If the resealable fixing is formed of a zipper, said zipper may have a width of 8 to 15 mm.

Figure 8:
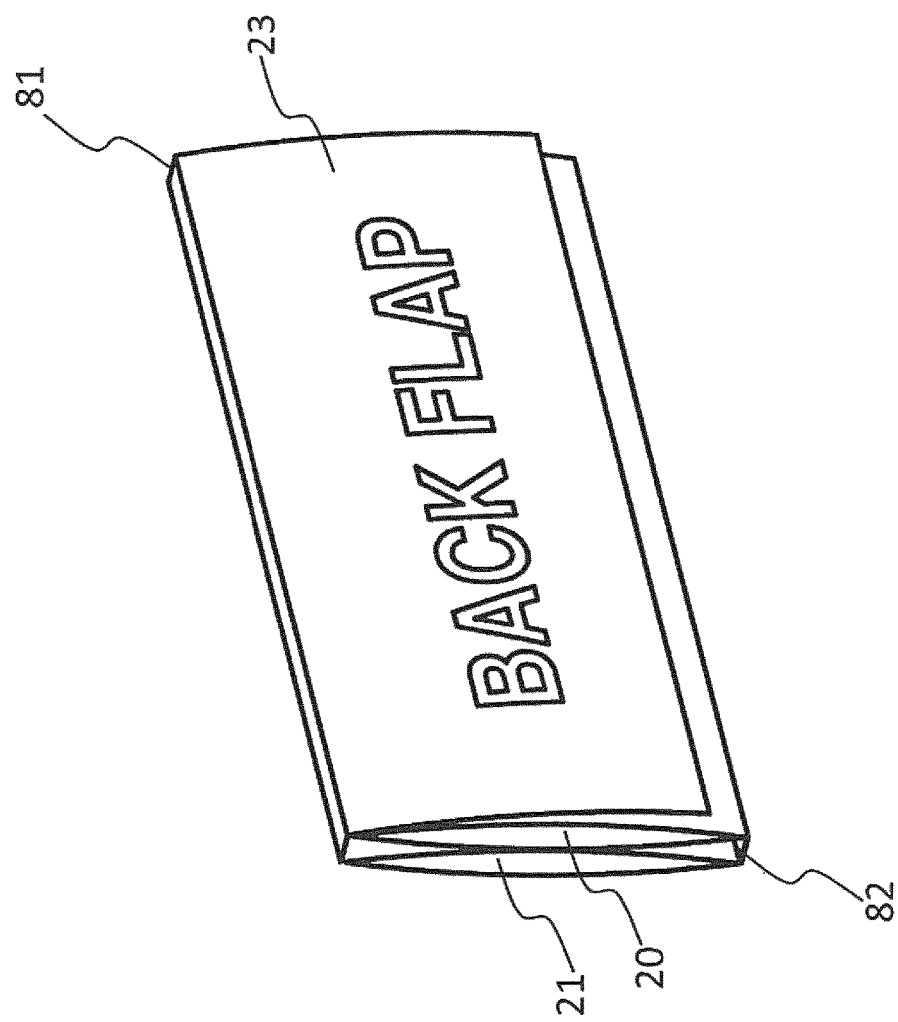
FIG. 8 shows the final pouch-type package of the invention formed of the flat sheet of FIG. 7 in a storage configuration.

Furthermore, the embodiment depicted in FIG. 7 comprises additional folding lines adjacent to the first temporary seal areas 16A, 16B, 17A and 17B. Those folding lines define sealing areas 81 B and 82B on the first flexible sheet part 6 and sealing areas 81A and 82A on the second flexible sheet part 7. After folding along the folding line 11, sealing areas 81A and 81 B come into contact and form sealing area 81, whereas sealing area 82A and 82B form sealing area 82. With folding along the additional folding lines limiting sealing areas 81 and 82, sealing areas 81 and 82 are folded from the remaining wide surface of the first flexible sheet part 6 and the second flexible sheet part 7, respectively. Preferably, the sealing areas 81 and 82 are folded at an angle of 70° to 120°, preferably of 80° to 110°, relative to the wide surface area of the first or the second flexible sheet part 6, 7, respectively. The resulting package is shown in FIG. 8, exhibiting sealing areas 81 and 82 which are arranged at opposing ends of the package and are approximately perpendicular to the remaining wide area of the flexible sheet parts 6 and 7. If the sealing areas 81 and 82 are folded away at such a preferred angle, the resulting package is able to stand on said sealing areas 81 and 82, i.e. said sealing areas 81 and 82 form a base or footprint for the package of the invention. Such a sealing area 81, 82 may have a width from 1 mm to 3 cm, preferably from 2 mm to 2.5 cm. If the sealing area 81, 82 has a width of less than 1 mm, said sealing area 81, 82 may be less suitable to serve as base or footprint for the package of the invention.

In other words, in the embodiment depicted in FIGS. 7 and 8, the first and the second temporary seals 16, 17 are formed in sealing areas 81, 82 of the first and second flexible sheet part 6, 7 which is then folded from a wide surface area of the first and second flexible sheet part 6, 7, respectively. By doing so, a pouch type package is, wherein the first compartment 20 is arranged in parallel to the second compartment 21 with a wide surface of the first compartment facing a wide surface of the second compartment. Preferably, the sealing areas 81, 82 are folded at an angle of 70° to 120°, preferably of 80° to 110°, relative to the wide surface area of the first or the second flexible sheet part 6, 7, respectively. If the sealing areas 81, 82 are folded at such a preferred angle, the package of the invention comprising such sealing areas 81, 82 is able to stand on said sealing areas 81, 82, i.e. said sealing areas 81, 82 may form a base or footprint for the package of the invention. Furthermore, the two sealing areas 81 and 82 are formed at opposing ends of the package (i.e. first and second temporary seals 16, 17 are formed in respective opposing sealing areas 81, 82 respectively), the resulting package will exhibit an improved stackability compared to classical pouch type packages.

In order to allow for improved package symmetry, the opposed sealing areas 81, 82 may be formed such that they are coordinated in size, width and/or position. Preferably, the opposing sealing areas 81, 82 exhibit equal size and/or width. Preferably, the opposing sealing areas 81, 82 are formed and located such that the resulting package exhibits a cuboid-like outer appearance, wherein the opposing sealing areas 81, 82 form two opposing faces of said cuboid.

The sealing areas 81, 82 may have a width which exceeds the sum of the thickness of the first compartment 20 and the second compartment 21 and, thus, allows for the formation of a spacing between the first and second compartment 20, 21. Such spacing may be used to place accessoires like e.g. a paper booklet between the first and second compartment 20, 21.

Each of said sealing area 81, 82 may have a width from 1 mm to 3 cm, preferably from 2 mm to 2.5 cm. If the sealing area 81, 82 has a width of less than 1 mm, said sealing area 81, 82 may be less suitable to serve as base or footprint for the package of the invention.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. he term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A package in the form of a tobacco pouch comprising:
   a first flexible sheet part;
   a second flexible sheet part;
   a first permanent seal between the first sheet part and the second sheet part along a first edge of the pouch;
   a second permanent seal between the first sheet part and the second sheet part along a second edge of the pouch opposite to the first edge;
   a first temporary seal between the first sheet part and the second sheet part, the first temporary seal extending across the pouch between the first permanent seal and the second permanent seal;
   a second temporary seal between the first sheet part and the second sheet part, the second temporary seal extending across the pouch from the first permanent seal to the second permanent seal;
   a first compartment bounded by the first sheet part, the second sheet part, the first permanent seal, the second permanent seal and the first temporary seal; and
   a second compartment bounded by the first sheet part, the second sheet part, the first permanent seal, the second permanent seal, the first temporary seal and the second temporary seal,
   wherein the first sheet part is longer than the second sheet part and wherein a portion of the first sheet part which is not overlapped by the second sheet part comprises a flap for the pouch, and
   wherein the first and/or the second temporary seal is formed in sealing areas of the first and second flexible sheet part respectively, wherein sealing areas are limited on each of their sides by folding lines and are folded from a wide surface area of the first and second flexible sheet part, wherein each folding line is folded at an angle of 70° to 120° relative to a wide surface area of the first or the second sheet part, respectively.

2. The package according to claim 1 wherein the first sheet part and the second sheet part are parts of a continuous flexible sheet, with the second sheet part folded against the first sheet part or wherein the first sheet part and the second sheet part are separate pieces of flexible sheet and the package further comprises a third permanent seal between the first sheet part and the second sheet part along a third edge of the pouch.

3. The package according to claim 1, wherein at least one of the first temporary seal and the second temporary seal comprise a peelable adhesive seal, a resealable seal, a resealable adhesive seal, or a resealable fixing.

4. The package according to claim 1, wherein the first temporary seal comprises or consists of a peelable seal and the second temporary seal comprises or consists of a resealable seal.

5. The package according to claim 1, wherein at least one of the first temporary seal and the second temporary seal further comprises a resealable fixing.

6. The package according to claim 1, wherein the flexible sheet parts comprise adhesive properties which vary according to temperature applied to the sheet parts, wherein the sheet parts have a first adhesion value at a first applied temperature and a second adhesion value at a second applied temperature, wherein the second adhesion value is lower than the first adhesion value and the second temperature is lower than the first temperature.

7. The package according to claim 1, wherein the flap comprises a temporary seal for sealing the flap against the pouch.

8. The package according to claim 1, wherein the second temporary seal is offset from a free edge of the second sheet part to form a throat of the pouch, wherein the first sheet part is overlapped by the second sheet part at the throat.

9. The package according to claim 1, wherein at least one of the compartments comprises a further seal between the first sheet part and the second sheet part which divides the compartment into two sub-compartments.

10. A package in the form of a tobacco pouch comprising:
   a first flexible sheet part;
   a second flexible sheet part;
   a first permanent seal between the first sheet part and the second sheet part along a first edge of the pouch;
   a second permanent seal between the first sheet part and the second sheet part along a second edge of the pouch opposite to the first edge;
   a first temporary seal between the first sheet part and the second sheet part, the first temporary seal extending across the pouch between the first permanent seal and the second permanent seal;
   a second temporary seal between the first sheet part and the second sheet part, the second temporary seal extending across the pouch from the first permanent seal to the second permanent seal;
   a first compartment bounded by the first sheet part, the second sheet part, the first permanent seal, the second permanent seal and the first temporary seal, the first compartment accessible through an opening created by the first temporary seal and the second temporary seal; and a second compartment bounded by the first sheet part, the second sheet part, the first permanent seal, the second permanent seal, the first temporary seal and the second temporary seal, wherein the first sheet part is longer than the second sheet part and wherein a portion of the first sheet part which is not overlapped by the second sheet part comprises a flap for the pouch, and wherein the first and/or the second temporary seal is formed in sealing areas of the first and second flexible sheet part respectively, wherein sealing areas are limited on each of their sides by folding lines and are folded from a wide surface area of the first and second flexible sheet part, wherein each folding line is folded at an angle of 70° to 120° relative to a wide surface area of the first or the second sheet part, respectively.

11. The package of claim 1 or claim 10, further comprising sealing areas 81 of the first and second flexible sheet part respectively, wherein sealing areas 81 are limited on each of their sides by folding lines and are folded from a wide surface area of the first and second flexible sheet part, wherein each folding line is folded at an angle of 70° to 120° relative to a wide surface area of the first or the second sheet part, respectively.

\* \* \* \* \*